(12) United States Patent
Hargarten et al.

(10) Patent No.: US 6,947,249 B1
(45) Date of Patent: Sep. 20, 2005

(54) METHOD AND APPARATUS FOR AUTOMATICALLY DETERMINING AN EMBEDDED RUNOUT CORRECTION THRESHOLD

(75) Inventors: Jim Hargarten, Lafayette, CO (US); Thomas Melrose, Longmont, CO (US); John Purkett, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 393 days.

(21) Appl. No.: 10/029,528

(22) Filed: Dec. 20, 2001

Related U.S. Application Data

(60) Provisional application No. 60/257,135, filed on Dec. 20, 2000.

(51) Int. Cl.[7] ............................................. G11B 5/596
(52) U.S. Cl. ................................................. 360/77.07
(58) Field of Search ........................... 360/77.04, 75, 360/78.04, 78.07, 77.02, 60, 77.07; 318/636

(56) References Cited

U.S. PATENT DOCUMENTS

| | | | | | |
|---|---|---|---|---|---|
| 4,412,165 | A | * | 10/1983 | Case et al. .................. 318/636 |
| 5,889,631 | A | * | 3/1999 | Hobson ........................ 360/75 |
| 5,949,605 | A | * | 9/1999 | Lee et al. ................. 360/77.04 |
| 6,115,203 | A | | 9/2000 | Ho et al. .................. 360/77.04 |
| 6,456,452 | B1 | * | 9/2002 | Hobson et al. .......... 360/78.07 |
| 6,532,129 | B1 | * | 3/2003 | Sri-Jayantha et al. .... 360/77.02 |
| 6,549,362 | B1 | | 4/2003 | Melrose et al. .......... 360/77.04 |
| 6,643,090 | B1 | * | 11/2003 | Pruett ....................... 360/78.04 |
| 6,657,810 | B1 | * | 12/2003 | Kupferman ............... 360/77.04 |
| 6,714,372 | B1 | * | 3/2004 | Codilian et al. .............. 360/60 |

* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

A method and apparatus for automatically determining an embedded runout correction threshold for a disk drive are disclosed. In prior systems, embedded runout correction thresholds were set for all disk drives in a production run. The present invention provides a technique for automatically determining an embedded runout correction threshold on a drive-by-drive basis, instead of a production run of drives basis.

31 Claims, 2 Drawing Sheets

METHOD AND APPARATUS FOR AUTOMATICALLY DETERMINING AN EMBEDDED RUNOUT CORRECTION THRESHOLD

CROSS-REFERENCE TO RELATED APPLICATION

Priority is claimed from U.S. Provisional Patent Application Ser. No. 60/257,135 filed Dec. 20, 2000, which is incorporated by reference herein in its entirety.

FIELD OF THE INVENTION

The present invention relates to transducer positioning in a magnetic data storage system, such as a computer disk drive. More particularly, the present invention relates to a method and apparatus for automatically determining an embedded runout correction (ERC) threshold, which may be used within a system to compensate for repetitive run-out (RRO) created during servo track write in a magnetic data storage system.

BACKGROUND OF THE INVENTION

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo scheme is generally implemented. The servo scheme uses servo data read from the disk surface to align the transducer with the desired track. The servo data is generally written to the disk using a servo track writer (STW).

In an ideal disk drive system, the tracks of the data storage disk are non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to certain problems, such as vibration, bearing defects, inaccuracies in the STW and disk clamp slippage, tracks are generally written differently from the ideal non-perturbed circular track shape. Positioning errors created by the perturbed nature of these tracks are known as written-in repetitive runout (STW_RRO).

The perturbed shape of these tracks complicates the transducer positioning function during read and write operations because the servo system needs to continuously reposition the transducer during track following to keep up with the constantly changing radius of the track centerline with respect to the center of the spinning disk. Furthermore, the perturbed shape of these tracks can result in problems such as track squeeze and track misregistration errors during read and write operations.

In order to reduce such problems, disk drive manufacturers have developed techniques to measure the STW_RRO, so that compensation values (also known as embedded runout correction values or ERC values) may be generated and used to position the transducer along an ideal track centerline. Examples of such techniques may be found in U.S. Pat. No. 4,412,165 to Case et al. entitled "Sampled Servo Position Control System", U.S. Pat. No. 6,115,203 to Ho et al. entitled "Efficient Drive-Level Estimation of Written-In Servo Position Error", and U.S. patent application Ser. No. 09/753,969 filed Jan. 2, 2001 and entitled "Method and Apparatus for the Enhancement of Embedded Runout Correction in a Disk Drive", all of which are incorporated herein by reference.

In some prior systems, disk drive manufacturers have resorted to developing compensation values for each and every sector of each and every track of a disk drive. That is, disk drive manufacturers have tried to develop compensation values so that each track appears to be nearly an ideally written track. However, as those skilled in the art will readily appreciate, developing compensation values associated with each and every sector of each and every track is extremely time consuming and, therefore, increases manufacturing times. Furthermore, valuable manufacturing time may be wasted on tracks that have been well-written.

In an attempt to reduce manufacturing times as compared to the above, disk drive manufacturers have developed a technique to correct only the most poorly-written tracks for a production run of disk drives, instead of all of the tracks of each drive. In such technique, an embedded runout correction (ERC) threshold is set for all disk drives in a production run. The ERC threshold is used to determine which tracks are to be corrected in a particular production run of disk drives.

More specifically, the position error due to repeatable runout (PES_RRO) is measured by track following and averaging the position error from the servo bursts in each servo sector associated with the track for multiple revolutions of the disk (e.g., 25 revolutions). As will be understood by those skilled in the art, the position error is averaged for multiple revolutions of the disk, so that the affects of non-repeatable runout may be averaged out.

If the absolute value of the average PES_RRO for any servo sector in the track exceeds the ERC threshold, the track is corrected. That is, compensation values are determined for all of the servo sectors of that track. However, if the absolute value of the average PES_RRO for all of the servo sectors in the track are less than the threshold, the track is not corrected.

In a similar technique, in which an attempt is made to reduce the number of revolutions required to measure the position error due to repeatable runout (PES_RRO), two ERC thresholds are used, namely, a high-sensitivity ERC threshold (i.e., a low value) and a low-sensitivity ERC threshold (i.e., a high value). Importantly, both the high-sensitivity ERC threshold and the low-sensitivity ERC threshold are set for all disk drives in a production run.

In the case of using high-sensitivity and low-sensitivity thresholds, the position error due to repeatable runout (PES_RRO) is measured by track following and averaging the position error from the servo bursts in each servo sector associated with the track for a relatively small number of revolutions of the disk (e.g., two revolutions). The absolute value of the average PES_RRO for each servo sector in the track is then compared to the high-sensitivity ERC threshold. If the absolute value of the average PES_RRO for each servo sector is less than the high-sensitivity ERC threshold, the track is not corrected and the next track is tested.

If, instead, the absolute value of the average PES_RRO for at least one of the servo sectors associated with the track is greater than the high-sensitivity ERC threshold, the position error from the servo bursts in each servo sector associated with the track is measured for additional revolutions of the disk (e.g., two additional revolutions) and is averaged into the existing average PES_RRO. The absolute value of the average PES_RRO (in this example, for four revolutions) for each servo sector in the track is then compared to the low-sensitivity threshold. If the absolute value of the average PES_RRO for each servo sector is less than the low-sensitivity threshold, the track is not corrected and the next track is tested. If, instead, the absolute value of the average PES_RRO for any one of the servo sectors is greater than the low-sensitivity threshold, the track is corrected. That is, compensation values are determined for all of the servo sectors of that track. This may include additional revolutions of position error averaging.

The two thresholds are used because, after only a small number of revolutions (e.g., two revolutions), a high amount of non-repeatable energy (which has not been averaged away) may affect the measurements of the PES_RRO. Thus, a well-written track might look like a poorly-written track, while a poorly-written track may look like a well-written track. Setting both a high-sensitivity ERC threshold and a low-sensitivity ERC threshold is believed to more accurately identify tracks which should be corrected, while reducing the overall time to make such a determination.

In yet another technique, a high-sensitivity ERC threshold and a low-sensitivity ERC threshold are set for both the read position and the write position of the read element. In such case, the high-sensitivity ERC threshold for the read position, the high-sensitivity ERC threshold for the write position, the low-sensitivity ERC threshold for the read position and the low-sensitivity ERC threshold for the write position are set for all disk drives in a production run.

As will be understood by those skilled in the art, the read element and the write element are offset from one another, and this offset varies across the stroke of the actuator arm due to head skew. Because write-to-write track misregistration is both a more common and more severe problem than write-to-read misregistration, the ERC thresholds are set to a much lower trigger point when the read element is in its write position as opposed to when the read element is in its read position. This is because the write element is generally between one and a half and two times wider than the read element and is slightly narrower than the width of a track. Thus, write position errors will tend to cause encroachment problems and, hence, data destruction. Accordingly, tolerances when the read element is in its read position are generally greater than tolerances when the read element is in its write position.

In general, the process of selecting and correcting poorly-written tracks takes place in a self-test procedure. Each drive is required to complete its self-test procedure within a predetermined period of time. If a drive does not complete its self-test procedure within the predetermined period of time, it is considered to have failed the self-test procedure ard is discarded. Thus, the setting of ERC thresholds is a compromise between the number of tracks being corrected and self-test time.

Typically, thresholds used to select which poorly-written tracks will be corrected are generally set at a very high level, so that only the worst tracks in a production run of drives are corrected and so that very few drives fail self-test due to the embedded runout correction procedure. Due to the thresholds being set on a production run of drives basis, most drives will only use a very small percentage of the self-test time to improve their poorly-written tracks, even though further time is available to make improvements to the tracks of such drives.

Accordingly, it would be desirable to make more efficient use of self-test time, so that additional tracks may be improved through the embedded runout correction procedure. Furthermore, it would be desirable to develop a scheme of automatically selecting one or more ERC thresholds on a drive-by-drive basis, instead of a product-by-product basis.

SUMMARY OF THE INVENTION

The present invention is designed to minimize the aforementioned problems and meet the aforementioned, and other, needs.

A method and apparatus for automatically determining an embedded runout correction threshold for a disk drive are disclosed. In prior systems, embedded runout correction thresholds were set for all disk drives in a production run. The present invention provides a technique for automatically determining an embedded runout correction threshold on a drive-by-drive basis, instead of a production run of drives basis.

In one embodiment, a percentage of tracks that should meet an embedded runout correction threshold is determined. Position error signal values due to repeatable runout for a plurality of sample tracks in the disk drive are measured. Maximum position error signal values due to repeatable runout associated with the sample tracks are determined. An embedded runout correction threshold is determined by using both the maximum position error signal values and the predetermined percentage of tracks that should meet the embedded runout correction threshold. The embedded runout correction threshold may be stored in memory and used in selecting tracks to be corrected.

Other objects, features, embodiments and advantages of the invention will be apparent from the following specification taken in conjunction with the following drawings.

DETAILED DESCRIPTION OF THE PREFERRED EMBODIMENT

Figure 1:
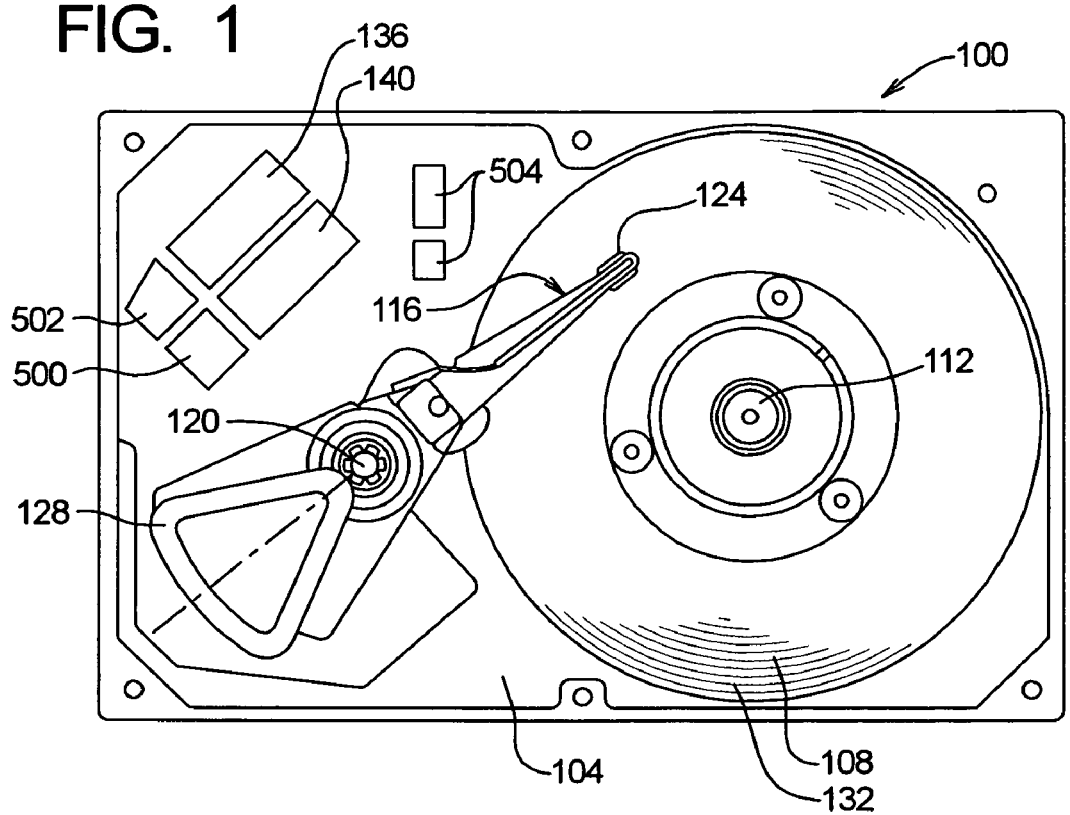
FIG. 1 is a diagrammatic representation of a computer disk drive, with its cover removed, in which the present invention may be implemented.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1 is a diagrammatic representation of a computer disk drive with which the present invention may be used. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1)

are interconnected to the base 104 by a bearing 120. The actuator arm assemblies 116 each include a transducer 124 (having both a read element and a write element) at a first end, to address each of the surfaces of the magnetic disks 108. A voice coil motor 128 pivots the actuator arm assemblies 116 about the bearing 120 to radially position the transducer 124 with respect to the magnetic disks 108. By changing the radial position of the transducer 124 with respect to the magnetic disks 108, the transducer 124 can access different data tracks or cylinders 132 on the magnetic disks 108. The voice coil motor 128 is operated by a controller 136 that is in turn operatively connected to a host computer (not shown). A channel 140 processes information read from the magnetic disks 108 by the transducer 124.

Figure 2:
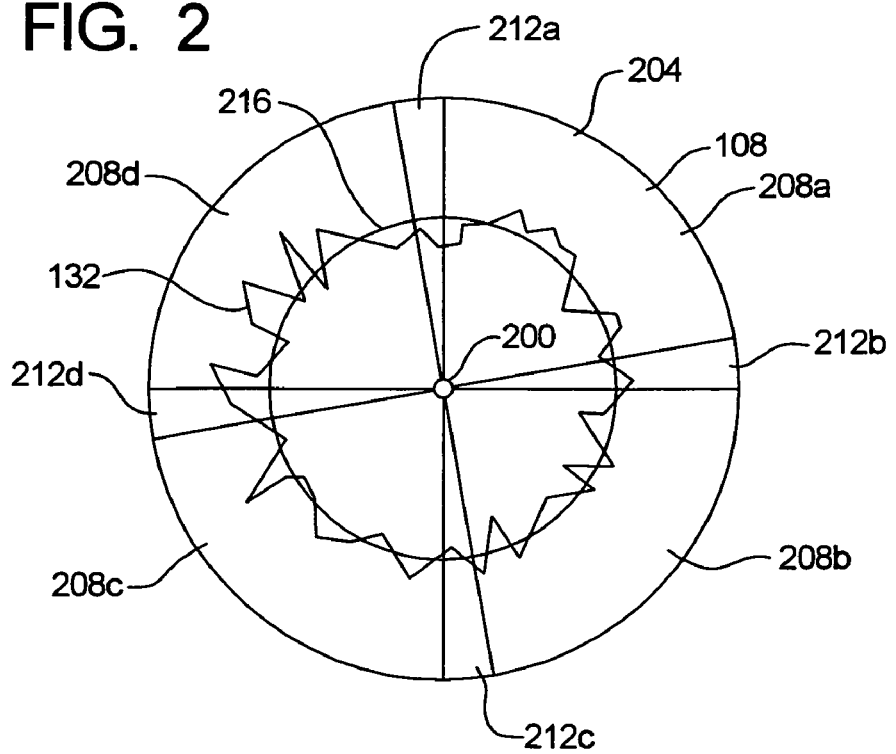
FIG. 2 is a diagrammatic representation of a magnetic storage disk having a perturbed track.

As illustrated in FIG. 2, the disk 108 is substantially circular in shape and includes a center point 200 located in the center of the disk 108. The disk 108 also includes a plurality of tracks 132 (only one of which is illustrated in FIG. 2) on an upper surface 204 of the disk 108 for storing digital data. The data tracks 132 are divided into data sectors 208a–208d and servo sectors 212a–212d. Generally, the data sectors 208a–208d are used for storing customer data as a series of magnetic transitions, while the servo sectors 212a–212d are used for storing servo information, also as a series of magnetic transitions. The servo information stored in servo sectors 212a–212d is used to provide the transducer 124 with positioning information. In particular, the servo sectors 212a–212d provide the transducer 124 with information concerning its position over the magnetic disk 108. More particularly, the servo sectors 212a–212d provide information to the transducer 124 concerning the identity of the track 132 and servo sector 212 over which the transducer 124 is flying, and concerning the position of the transducer with respect to the centerline of the track 132.

Although the magnetic disk 108 illustrated in FIG. 2 is illustrated as having a only a single track 132 and a relatively small number of data sectors 208 and servo sectors 212, it can be appreciated that a typical computer disk drive contains a very large number tracks 132, along with a very large number of data sectors 208 and servo sectors 212. For example, computer disk drives having over 35,000 tracks per inch and 240 sectors are presently available.

The disk drive 100 includes a servo control system for controlling the position of a transducer 124 with respect to a track 132 being followed. In general, the servo control system comprises the transducer 124 being positioned, which reads position error information from the servo sectors 212; the actuator arm assembly 116 that is carrying the transducer 124; the voice coil motor 128; the channel 140; and the controller 136.

The track 132 is ideally non-perturbed and ideally shares a common center 200 with the disk 108, such as ideal track 216 illustrated in FIG. 2. Due to system imperfections, however, the actual written track 132 can be perturbed as compared to an ideal track 216 such as non-ideal track 132 as illustrated in FIG. 2.

A perturbed or non-ideal track 132 is difficult for a transducer 124 to follow, because the position of the transducer 124 must constantly be adjusted by the servo control system. Consequently, the positioning of the transducer 124 is not as accurate on the written track 132 as it would be on an ideal track 216. The present invention provides a method and apparatus for automatically selecting an embedded runout correction (ERC) threshold on a drive-by-drive basis to assist in the selection of non-ideal tracks to be corrected. By determining embedded runout correction (ERC) values for those tracks, a transducer 124 may more closely follow the path of an ideal track, such as the path of track 216.

As mentioned above, the tracks 132 on the disk 108 are each divided into a plurality of data sectors 208 and servo sectors 212. The servo sectors 212 include, among other things, information for use by the disk drive 100 in locating a transducer 124 above a desired track 132 of the disk 108. When a host computer requests that data be read from or written to a particular track 132 and data sector 208 of the disk 108, the transducer 124 must be moved to the track 132 and then must be positioned at a predetermined location relative to the centerline of the track 132 before data transfer can take place. For purposes of illustrating the present invention, it will be assumed that the transducer should be placed on a track centerline in order to read data from and write data to the disk. It should be understood that the invention is not limited to solely reading and writing when the transducer is placed at the track centerline.

The disk drive 100 uses the information stored in the servo sector 212 portions of the tracks 132 to first locate the desired track and to then appropriately position the transducer 124 with respect to the centerline of the desired track. The customer data sectors 208 include data that can be accessed by an external host computer for use in connection with a central processing unit (CPU) located therein. In general, the number of servo sectors 212 per track 132 on the disk 108 is a matter of design choice. The number may be dictated by, for example, a required servo update rate for the disk drive.

Figure 3:
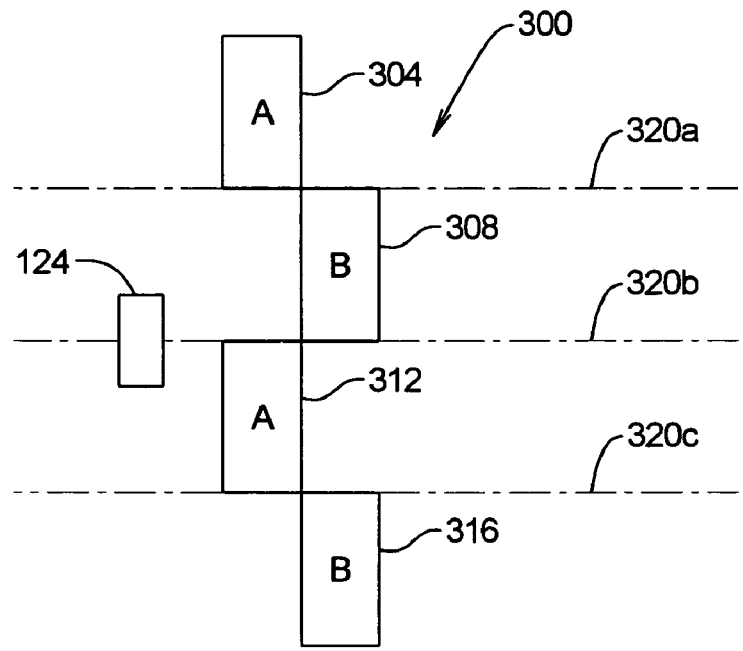
FIG. 3 is a diagrammatic representation of a servo burst pattern that may be used to position a transducer with respect to a track centerline; and, FIG. 4 is a flowchart which illustrates a method of determining an ERC threshold for a disk drive in accordance with one embodiment of the present invention.

FIG. 3 illustrates a typical servo pattern 300 stored within the servo portion of a servo sector 212 for use in centering a transducer 124 on a desired track 132. The servo pattern 300 includes a plurality of servo bursts 304, 308, 312 and 316 that define the centerlines 320a–c of the tracks 132 of the disk 108. Servo bursts 304, 308, 312 and 316 are divided into A bursts 304, 312 and B bursts 308, 316 that are each approximately (but are not limited to) a track-width wide and that alternate across the disk surface. The boundary between an A burst and an adjacent B burst (e.g., A burst 312 and B burst 308) defines a centerline (e.g., centerline 320b) of a track 132 on the disk 108.

To center the transducer 124 using the A and B bursts, the transducer 124 is first moved to the desired track 132 during a seek operation and, once there, is allowed to read the A and B bursts on the desired track 132. The signal magnitudes resulting from reading the A and B bursts are then combined (such as by subtracting the B burst magnitude from the A burst magnitude) to achieve an error signal, known as the position error signal (PES). The PES indicates the distance between the center of the transducer 124 and the centerline (e.g. centerline 320b) of the desired track. The PES signal is used by the disk drive 100 to change the position of the transducer 124 to one that is closer to the desired (centered) position. This centering process is repeated for each successive sector on the track until the requested read/write operation has been performed in the appropriate data sector(s) 208 of the disk 108. It should be appreciated that other schemes for storing servo information on the magnetic media, such as schemes having A, B, C and D position bursts; using zones; constant linear density (CLD) recording, split data fields; and/or hybrid servo, can also be used in accordance with the present invention.

The A 304, 312 and B 308, 316 bursts, as well as other servo information, are generally written to the surface 204 of the disk 108 using a servo track writer (STW) after the disk 108 is assembled into the disk drive 100 during the manufacturing process. It is these A and B bursts which define the location of the written tracks on the disk 108. That is, on a non-ideal track (such as track 132 of FIG. 2) the A and B bursts are written such that the centerline of the track 132 does not describe a perfect circle, but rather is perturbed. However, the transducer 124 can be made to follow the path of an ideal track 216 by adding an appropriate offset or embedded runout correction (ERC) value to the PES signal in each of the servo sectors 212 of a particular track 132. Methods of calculating ERC values are well-known in the art.

Once calculated, ERC values are generally stored in servo sector portions 212 of the disk 108 for use in positioning the transducer 124 on an ideal track path 216 during track following operations. ERC values may also be stored in look-up tables maintained in the disk drive 100 or in any other suitable storage location, such as in memory included in or accessible to the disk drive 100. As illustrated in FIG. 2, the offset amount between the centerline of the non-ideal track 132 and the path of the ideal track 216 may be different in each servo sector 212a–d of the track.

In the absence of ERC values, transducer 124 may follow a relatively perturbed path, such as that of a non-ideal track 132 in FIG. 2. In such case, the position of the transducer 124 must be constantly adjusted to keep the transducer "centered" on track 132 as the disk 108 rotates. The transducer position is adjusted, as described above, by deriving a PES signal from the position bursts, such as from the A 312 and B 308 bursts where centerline 320b is being followed. The PES signal is used to create a control signal for a movement means (such as a voice coil motor) to move the transducer 124 an appropriate amount. Because the transducer 124 position is continuously being adjusted, perfect or near perfect registration between the transducer 124 center and the centerline of the track 132 (e.g., centerline 320b) is rarely achieved. This can create problems such as high track misregistration values.

As mentioned above, the selection of tracks to be corrected is generally performed during a self-test process. Furthermore, as mentioned above, conventionally, ERC thresholds are set on a production run of drives basis.

The inventors have determined that self-test times may be more efficiently used in some drives by automatically setting one or more embedded runout correction (ERC) thresholds on a drive-by-drive basis, instead of presetting one or more ERC thresholds on a production run of drives basis. Broadly stated, in one embodiment, the present invention is a method comprising the steps of providing a plurality of disk drives; and, determining an embedded runout correction threshold for each of the disk drives on a drive-by-drive basis.

Figure 4:
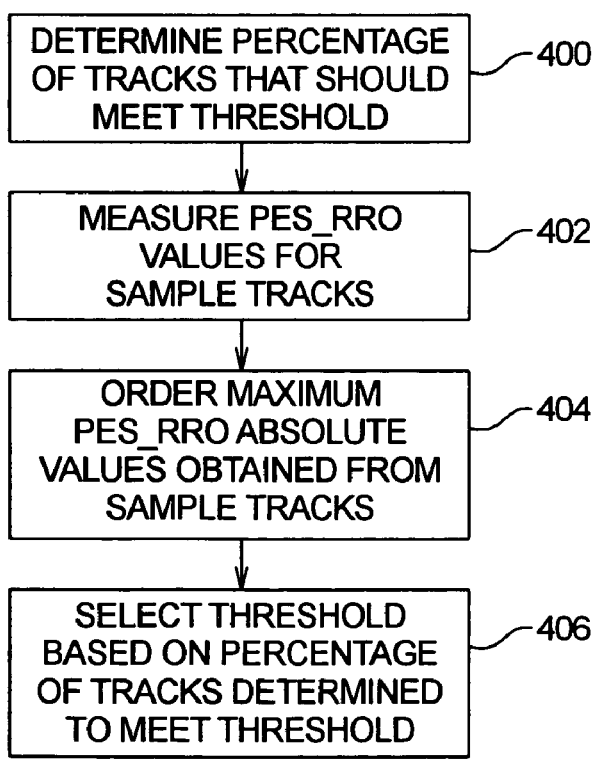

FIG. 4 is a flowchart which illustrates a method of determining an ERC threshold for a disk drive in accordance with one embodiment of the present invention. In step 400, a determination is made as to the percentage of tracks that should meet the threshold. This determination is generally based upon the amount of self-test time available for correcting tracks, the amount of time necessary to correct tracks, the number of tracks and tolerances associated with both the track correcting process and other self-test processes.

If multiple ERC thresholds are used, such as a high-sensitivity threshold and a low-sensitivity threshold (or high-sensitivity and low-sensitivity thresholds when the read head is in both its read position and in its write position), determinations should be made as to the percentage of tracks that should meet each of the ERC thresholds. As will be understood by those skilled in the art, the determinations will generally be made using criteria similar to those described in connection with a single ERC threshold.

Next, in step 402, PES values due to repeatable runout (PES_RRO values) are measured for sample tracks in the disk drive 100. The inventors of the present invention have determined that, by taking a good statistical sample of the PES_RRO values in the disk drive 100, a close approximation may be made of the expected PES_RRO values of the entire disk drive. As will be described in more detail in connection with steps 404 and 406, the sample PES_RRO values are used in selecting the ERC threshold.

In a typical disk drive (e.g., a drive with 50,000 tracks per disk surface and 6 heads), the inventors have determined that PES_RRO values should be obtained from at least 200 sample tracks in order to obtain a good statistical sample. In one embodiment, PES_RRO values are obtained from at least 500 sample tracks per disk surface. As will be understood by those skilled in the art, the greater the number of tracks sampled, the better the statistical sample. However, the quality of the statistical sample must be balanced against the amount of self-test time required to obtain the samples. The number of tracks to be sampled is generally independent of number of tracks and number of disk surfaces, but the more samples taken will give a better estimate of the distribution. The number of tracks to be sampled is prescribed by a disk drive manufacturer and stored in the disk drive's firmware. In determining which tracks to sample, a step-width calculation may be performed in order to sample tracks from nearly all areas across all disk surfaces in the drive. More specifically, based upon a known number of tracks to be sampled, the number of tracks on each disk surface and the number of disk surfaces (all of which are generally known by the disk drive's firmware), a calculation can be made by the drive to determine a step-width, so that PES_RRO values may be measured for sample tracks (that are equally-spaced) from nearly all areas across all disk surfaces. For example, the step width (SW) may be given by: SW=(N)(TD)/(SD), where N is the number of disk surfaces, TD is the number of tracks per disk surface and SD is the number of samples per disk. Once the step width is determined, sample tracks are selected by stepping the transducer(s) of the disk drive across the disk surface(s), for example, from outer diameter (OD) to inner diameter (ID) or visa-versa.

PES_RRO values are measured for each of the sample tracks, and the absolute values of the maximum PES_RRO associated with each of the sample tracks are stored in memory (e.g., memory 500 in FIG. 1). As will be understood by those skilled in the art, the PES_RRO may be measured in many ways. In general, the PES_RRO for a track 132 is determined by following the track 132 (e.g., in some cases, by being a percentage off-track, while in other cases being on-track), and reading the position error from the servo bursts (e.g., servo bursts 308 and 312 in FIG. 3) in each servo sector 212 associated with the track 132 for multiple revolutions of the disk 108. As will be appreciated by those of ordinary skill in the art, reading the position error over multiple revolutions may permit the affects of non-repeatable runout to be averaged out. According to one embodiment of the present invention, position error information is taken over as many as 25 revolutions of the disk 108 in generating PES_RRO data for a particular track 132 on a disk surface 204.

In another embodiment of the present invention, where high-sensitivity and a low-sensitivity ERC thresholds are used, first PES_RRO measurements are taken when the transducer is 5% off-track towards the ID for one revolution and then second PES_RRO measurements are taken when the transducer is 5% off-track towards the OD for one revolution. The first and second PES_RRO measurements are then averaged. The maximum PES_RRO absolute value, based upon the average, for the track is then recorded. This value will be used in connection with determining the high-sensitivity ERC threshold. Next, third and fourth PES_RRO measurements are taken while the transducer is on-track. Then, the first, second, third and fourth PES_RRO measurements are averaged. The maximum PES_RRO absolute value, based upon the four revolution average, for the track is recorded. This value will be used in connection with determining the low-sensitivity ERC threshold.

In yet another embodiment, similar measurements may be taken in case high-sensitivity and low-sensitivity ERC thresholds are to be obtained while the read element is in its read position and while the read element is its write position. Other variations will readily come to mind to those skilled in the art based upon their reading of this disclosure. As will be appreciated by those skilled in the art, the invention allows for the selection of many ERC thresholds, each of which may be tailored so that a predetermined percentage of tracks meet the threshold.

With reference again to FIG. 4, in step 404 the maximum PES_RRO absolute values associated with each sample track (for each ERC threshold to be determined) are sorted from, for example, highest value to lowest value. In step 406, a threshold is selected based upon the determined percentage of tracks that was to meet the threshold (from step 400). For example, if: (a) a total of 1000 maximum PES_RRO absolute values were obtained in order to select a single ERC threshold, (b) the 1000 maximum PES_RRO absolute values were sorted from largest to smallest, and (c) a determination was made that 25% of the tracks should meet the threshold in step 400, then the $250^{th}$ value would be selected as the ERC threshold.

Once the ERC threshold is selected, it is stored in the drive (e.g., in memory or on the disk surface). The ERC threshold may then be used in determining which tracks are to be corrected. That is, PES_RRO measurements are taken for each track of the drive and the maximum PES_RRO absolute value for a track is compared to the ERC threshold to determine if the track should be corrected. Importantly, the manner of measuring the PES_RRO to determine the ERC threshold should be consistent with the manner of measuring the PES_RRO to determine whether a track requires correction. Furthermore, all other disk drive parameters should be the same when making both measurements. For example, measurements should be taken at the same off-track positions, for the same number of revolutions, at the same channel settings, and after the servo system has been optimized. Other parameters that should be consistent when making both measurements will be understood by those skilled in the art.

Instead of storing the maximum PES_RRO absolute values associated with each sample track in memory 502, a histogram may be used to count the number of maximum PES_RRO absolute values that are a particular value. In such case, the ERC threshold may be determined by multiplying the number of counts associated with a particular value (from largest value to smallest) until a predetermined percentage of the total sum of all maximum PES_RRO absolute values has been reached. The ERC threshold will be the value associated with the particular counter after the predetermined percentage has been reached. It is believed that between 50 and 75 counters should be adequate, instead of many thousands of memory locations associated with a sorted list of samples.

In one embodiment, in order to increase the efficiency of the self-test process, comparisons between the selected ERC threshold and the PES_RRO measurements for each track in the drive are performed in the flaw scan process. In general, the flaw scan process is also performed during self-test. As is known by those skilled in the art, position error signals are generally read for each track of a disk drive during the flaw scan process.

Advantageously, if a drive has tracks that are generally well-written, the worst tracks of that drive will be improved, even though none of the tracks might have been selected for correction via a production run based ERC threshold. Thus, all drives will spend a good portion of their available self-test time correcting a predetermined percentage of their tracks.

Furthermore, the present invention is believed to improve track misregistration and drive yield. The improvements may also allow the track pitch to be increased, thereby increasing the overall storage capacity of drives which use the invention.

As those skilled in the art will readily appreciate, the present invention may be implemented entirely in the firmware of the disk drive. Alternatively, equivalent electronic circuits in the disk drive (e.g., electronic circuits 504 in FIG. 1) may also be used to implement the invention.

By knowing the approximate amount of self-test time available to perform track corrections and by knowing the approximate amount of time required to develop and store ERC values in correcting a track, one or more ERC thresholds may be selected so that a predetermined percentage of tracks may be corrected in a disk drive. Those skilled in the art will readily identify additional factors that may be used in determining the percentage of tracks that may corrected in the drive in view of this disclosure.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising:
    providing a plurality of disk drives; and,
    automatically determining an embedded runout correction threshold for each of the disk drives on a drive-by-drive basis.

2. The method of claim 1, wherein the disk drive includes a plurality of tracks and a predetermined percentage of tracks that should meet the embedded runout correction threshold is used in automatically determining the embedded runout correction threshold.

3. The method of claim 2, wherein the predetermined percentage of tracks that should meet the embedded runout correction threshold is based upon at least one of:
    available self-test time for correcting tracks in the drive; and,
    time necessary for correcting tracks.

4. A method for determining an embedded runout correction threshold in a disk drive, said method comprising:
    predetermining a percentage of tracks that should meet the embedded runout correction threshold;

measuring position error signal values due to repeatable runout for a plurality of sample tracks in the disk drive; and, storing, in memory, absolute values of maximum position error signal values due to repeatable runout associated with the plurality of sample tracks.

5. The method of claim 4, further comprising:
sorting the maximum position error signal absolute values due to repeatable runout.

6. The method of claim 5, further comprising:
selecting an embedded runout correction threshold from the sorted maximum position error signal absolute values based upon the predetermined percentage of tracks that should meet the embedded runout correction threshold.

7. The method of claim 6, further comprising:
storing the selected embedded runout correction threshold in memory.

8. The method of claim 7, further comprising:
using the stored embedded runout correction threshold in selecting tracks to be corrected.

9. The method of claim 5, wherein the maximum position error signal absolute values are sorted from highest to lowest.

10. The method of claim 4, wherein a predetermined number of sample tracks, for which position error signal values due to repeatable runout are measured, is stored in firmware of the disk drive.

11. The method of claim 10, wherein the predetermined number of sample tracks is greater than 200 for the disk drive.

12. The method of claim 10, wherein the predetermined number of sample tracks is at least 500 for each disk surface in the disk drive.

13. The method of claim 4, wherein the plurality of sample tracks, for which position error signal values due to repeatable runout are measured, are generally equally-spaced across a disk surface of the disk drive.

14. The method of claim 4 further comprising:
performing a step-width calculation to select sample tracks on a disk surface of the disk drive for which position error signal values due to repeatable runout are measured.

15. The method of claim 14, wherein the step-width (SW) is given by:
SW=(N)(TD)/(SD), where N represents a known number of disk surfaces in the disk drive, TD represents a known number of tracks per disk surface and SD represents a predetermined number of sample tracks per disk surface.

16. A method for determining an embedded runout correction threshold in a disk drive, said method comprising:
predetermining a percentage of tracks that should meet the embedded runout correction threshold;
measuring position error signal values due to repeatable runout for a plurality of sample tracks in the disk drive; and,
determining maximum position error signal values due to repeatable runout associated with the plurality of sample tracks.

17. The method of claim 16, further comprising:
determining an embedded runout correction threshold using both the maximum position error signal values and the predetermined percentage of tracks that should meet the embedded runout correction threshold.

18. The method of claim 17, further comprising:
storing the embedded runout correction threshold in memory.

19. The method of claim 18, further comprising:
using the stored embedded runout correction threshold in selecting tracks to be corrected.

20. The method of claim 16, wherein a predetermined number of sample tracks, for which position error signal values due to repeatable runout are measured, is stored in firmware of the disk drive.

21. The method of claim 16, wherein the plurality of sample tracks, for which position error signal values due to repeatable runout are measured, are generally equally-spaced across a disk surface of the disk drive.

22. A method comprising:
providing a plurality of disk drives; and,
automatically determining first and second embedded runout correction thresholds for each of the disk drives on a drive-by-drive basis.

23. The method of claim 22, wherein the disk drive includes a plurality of tracks and wherein:
a first predetermined percentage of tracks that should meet the first embedded runout correction threshold is used in automatically determining the first embedded runout correction threshold; and,
a second predetermined percentage of tracks that should meet the second embedded runout correction threshold is used in automatically determining the second embedded runout correction threshold.

24. The method of claim 23, wherein the first predetermined percentage of tracks that should meet the embedded runout correction threshold is based upon at least one of:
available self-test time for correcting tracks in the drive; and,
time necessary for correcting tracks.

25. The method of claim 22, wherein the first embedded runout correction threshold is a high-sensitivity embedded runout correction threshold.

26. The method of claim 22, wherein the second embedded runout correction threshold is a low-sensitivity embedded runout correction threshold.

27. A disk drive comprising:
a disk surface having a plurality of tracks written thereon;
circuitry for selecting a plurality of sample tracks from said plurality of tracks;
circuitry for measuring position error signal values due to repeatable runout for the plurality of sample tracks in the disk drive;
circuitry for determining maximum position error values due to repeatable runout associated with the plurality of sample tracks;
a memory unit having information related to a predetermined percentage of tracks that should meet an embedded runout correction threshold stored therein; and,
circuitry for determining an embedded runout correction threshold using both the maximum position error signal values and the information related to the predetermined percentage of tracks that should meet the embedded correction threshold.

28. The apparatus of claim 27, wherein the embedded runout correction threshold is stored in the memory unit.

29. A method for determining an embedded runout correction threshold on a drive-by-drive basis, the method comprising:
   sampling tracks of a disk drive to determine maximum position error signal values due to repeatable runout; and,
   determining an embedded runout correction threshold for the disk drive based on the maximum position error signal values determined for the sampled tracks.

30. The method of claim 29, wherein the embedded runout correction threshold is determined based upon a predetermined percentage of tracks in the disk drive that should meet the embedded runout correction threshold.

31. The method of claim 29, further comprising:
   storing the determined embedded runout correction threshold in memory.

* * * * *